United States Patent
Kim et al.

(10) Patent No.: US 12,224,643 B2
(45) Date of Patent: Feb. 11, 2025

(54) COMPOSITE OIL SEAL HAVING ELECTRIC CORROSION PREVENTION FUNCTION

(71) Applicant: PYUNGHWA OIL SEAL INDUSTRY CO., LTD., Daegu (KR)

(72) Inventors: Tae-Hyung Kim, Daegu (KR);
Eun-Min Park, Daegu (KR);
Jae-Hyuk Sung, Daegu (KR)

(73) Assignee: PYUNGHWA OIL SEAL INDUSTRY CO., LTD., Daegu (KR)

( * ) Notice: Subject to any disclaimer, the term of this patent is extended or adjusted under 35 U.S.C. 154(b) by 0 days.

(21) Appl. No.: 18/198,605

(22) Filed: May 17, 2023

(65) Prior Publication Data

US 2024/0250575 A1 Jul. 25, 2024

(30) Foreign Application Priority Data

Jan. 20, 2023 (KR) ........................ 10-2023-0008982

(51) Int. Cl.
*F16J 15/3284* (2016.01)
*F16J 15/34* (2006.01)
*H02K 5/124* (2006.01)
*F16J 15/3208* (2016.01)
*F16J 15/3232* (2016.01)

(52) U.S. Cl.
CPC .......... *H02K 5/124* (2013.01); *F16J 15/3284* (2013.01); *F16J 15/348* (2013.01); *F16J 15/3208* (2013.01); *F16J 15/3232* (2013.01)

(58) Field of Classification Search
CPC .. F16J 15/3204; F16J 15/3208; F16J 15/3216; F16J 15/3224; F16J 15/3252; F16J 15/3268; F16J 15/3276; F16J 15/3284
See application file for complete search history.

(56) References Cited

FOREIGN PATENT DOCUMENTS

| CN | 108799499 A | * | 11/2018 | ........... F16J 15/3204 |
|---|---|---|---|---|
| DE | 102013000982 A1 | * | 7/2014 | ............. F16J 15/002 |
| EP | 3835628 B1 | * | 5/2023 | ............. F16J 15/064 |
| JP | 2000509903 A | * | 8/2000 | |
| KR | 10-2014-0021428 A | | 2/2014 | |

\* cited by examiner

*Primary Examiner* — Gilbert Y Lee
(74) *Attorney, Agent, or Firm* — Paratus Law Group, PLLC

(57) ABSTRACT

There is provided a composite oil seal having an electric corrosion prevention function, which is mounted on a shaft in a motor housing to prevent leakage of oil in the motor housing. The composite oil seal includes a seal main body, which is formed of an elastic material and has an outer circumferential surface formed to be in tight contact with an inner circumferential surface of the motor housing and at least one lip protruding inwards so as to be in contact with an outer circumferential surface of the shaft, and an electrical path fabric, which is formed by weaving metallic yarns and is mounted to the seal main body to electrically connect the shaft to the motor housing so that current induced in the shaft flows to the motor housing.

6 Claims, 5 Drawing Sheets

COMPOSITE OIL SEAL HAVING ELECTRIC CORROSION PREVENTION FUNCTION

CROSS-REFERENCE TO PRIOR APPLICATION

This application claims priority to Korean Patent Application No. 10-2023-0008982 (filed on Jan. 20, 2023), which is hereby incorporated by reference in its entirety.

BACKGROUND

The present invention relates to an oil seal mounted in a motor, and more particularly to a composite oil seal having an electric corrosion prevention function, which prevents electric corrosion of a bearing by transmitting current induced in a shaft of the motor to a motor housing and allowing the current to flow to the ground.

A driving motor, which is used as a power source for electric vehicles or hybrid vehicles, basically includes a motor housing, a stator, and a rotor. The rotor has a shaft extending along a central axis thereof, and a wire is wound around the shaft. The shaft is supported by a bearing, and extends to the outside of the motor housing to output rotational force.

Meanwhile, in the case of a driving motor configured to operate using a frequency conversion scheme due to switching of an inverter, current is induced in a shaft during operation thereof. The current induced in the shaft is discharged to the ground through a bearing. At this time, a micro-arc is generated in the bearing, which causes damage to the surface of the bearing. If this phenomenon is repeated, a lubricant film of the bearing is destroyed, and scratches are increased on the surface of the bearing, leading to loss of function of the bearing. The above problem is more serious in the case of high-capacity and high-torque driving motors.

In order to solve the above problem, a technique of mounting a shaft ground ring for conductively connecting a shaft to a motor housing between the shaft and the motor housing has been developed.

However, the conventional shaft ground ring is very expensive despite having a relatively simple configuration. Further, the shaft ground ring is fixed to the shaft in a bolt-coupling manner or a clamping manner, or is press-mounted on the shaft.

Furthermore, a space for mounting of the shaft ground ring is required, and it is necessary to separately machine the shaft and the motor housing in order to fix the shaft ground ring thereto.

RELATED ART DOCUMENT

Patent Document (Patent Document 1) Korean Patent Laid-Open Publication No. 10-2014-0021428

SUMMARY

The present invention has been made to solve the above problems, and it is an object of the present invention to provide a composite oil seal having an electric corrosion prevention function, which transmits current induced in a shaft to the outside while performing a basic sealing function, thereby preventing damage to a bearing, preventing electrical defects of a motor, and increasing the lifespan of the motor.

In addition, it is another object of the present invention to provide a composite oil seal having an electric corrosion prevention function, which may be used semi-permanently, which makes it unnecessary to machine a housing or a shaft for mounting thereof, and which does not require a separate space for mounting of a shaft ground ring.

In order to accomplish the above and other objects, a composite oil seal having an electric corrosion prevention function according to the present invention is mounted on a shaft in a motor housing to prevent leakage of oil in the motor housing, and includes a rigid frame, a seal main body formed of an elastic material, the seal main body being bonded to and supported by the rigid frame, the seal main body having an outer circumferential surface formed to be in tight contact with an inner circumferential surface of the motor housing and at least one lip protruding inwards so as to be in contact with an outer circumferential surface of the shaft, and an electrical path fabric formed by weaving metallic yarns, the electrical path fabric being mounted to the seal main body to electrically connect the shaft to the motor housing so that current induced in the shaft flows to the motor housing.

The metallic yarns may be unit stainless yarns, each being formed by combining a plurality of stainless yarns, and the electrical path fabric may be a plain weave formed by weaving the unit stainless yarns in such a manner that a warp and a weft cross over and under one another.

Alternatively, the metallic yarns may be unit stainless yarns, each being formed by combining a plurality of stainless yarns, and the electrical path fabric may be a twill weave formed by weaving the unit stainless yarns in such a manner that warps and wefts cross each other.

The metallic yarns may be coated with a conductive coating liquid. In this case, the conductive coating liquid may be made of polyimide or silicone.

The electrical path fabric may have a generally hollow-disc-shaped section, and may include a center portion adhered to the seal main body, one end formed to be in contact with an inner surface of the motor housing, and another end formed to be in contact with an outer surface of the shaft.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Hereinafter, exemplary embodiments of the present invention will be described in detail with reference to the accompanying drawings.

A composite oil seal according to an embodiment may perform both an oil-sealing function and a grounding function for discharging current induced in a shaft to a motor housing, thereby preventing damage to a bearing due to static electricity.

Such a composite oil seal is realized merely by adding a grounding function to an oil seal, which is essentially mounted in a motor. Therefore, it is possible to completely resolve inconveniences in mounting a conventional ground ring.

Figure 1:
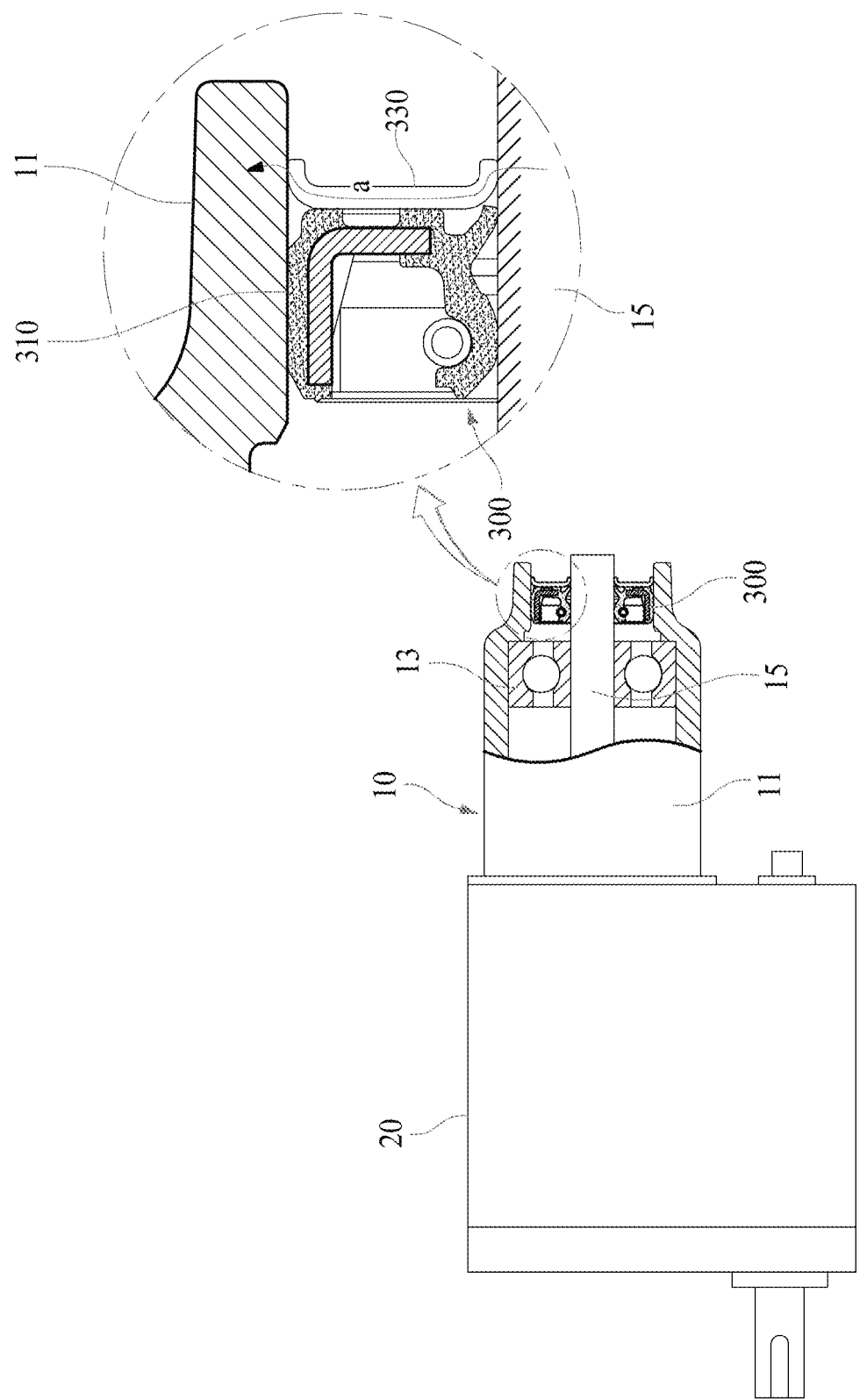
FIG. 1 is a view showing a motor to which a composite oil seal having an electric corrosion prevention function according to an embodiment of the present invention is applied.
Figure 2:
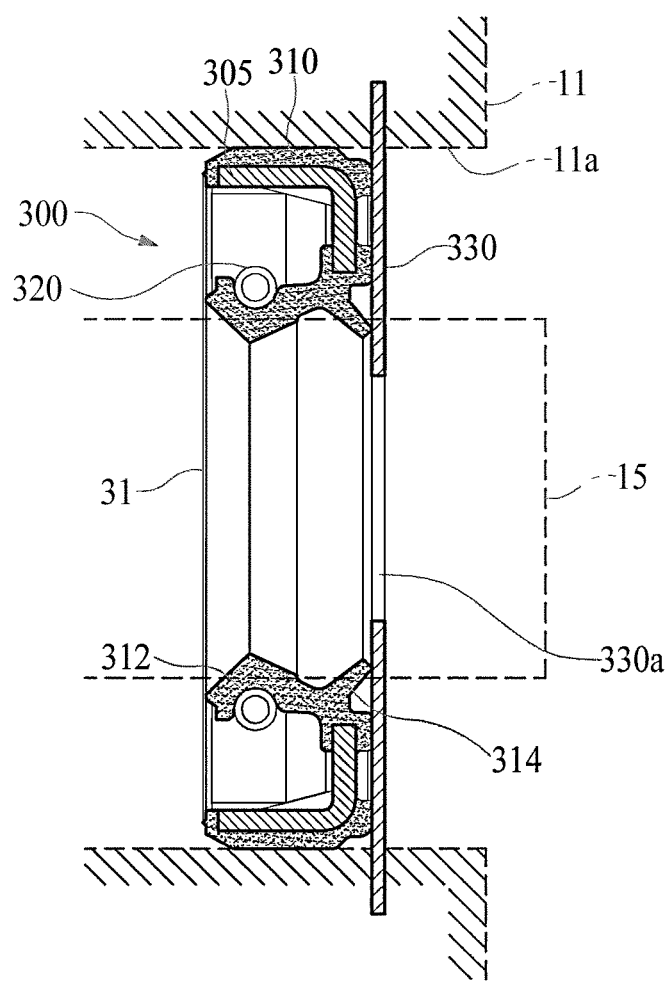
FIG. 2 is a cross-sectional view of the composite oil seal shown in FIG. 1.

FIG. 1 is a view showing a motor 10 to which a composite oil seal 300 having an electric corrosion prevention function according to an embodiment of the present invention is applied, and FIG. 2 is a cross-sectional view of the composite oil seal shown in FIG. 1.

As shown in the drawings, a shaft 15 is mounted in a motor housing 11 constituting the motor 10. The shaft 15 rotates in the state of being supported by a bearing 13 and transmits rotational torque to a reducer 20. One end portion of the shaft 15 extends so as to be exposed to the outside of the motor housing 11.

In addition, the composite oil seal 300 is located beside the bearing 13.

The composite oil seal 300 includes a rigid frame 305, a seal main body 310, and an electrical path fabric 330.

The rigid frame 305 is made of a rigid material such as metal. The seal main body 310 is formed of an elastic material, and is bonded to and supported by the rigid frame 305. The seal main body 310 has an outer circumferential surface that is in contact with the inner circumferential surface of the motor housing 11 and at least one lip protruding inwards so as to be in contact with the outer circumferential surface of the shaft 15.

The lip may include a main lip 312 and a dust lip 314. The main lip 312 is a protruding portion that is located farther inward than the dust lip 314 and protrudes toward the outer circumferential surface of the shaft 15. The main lip 312 resiliently presses the outer circumferential surface of the shaft to prevent leakage of a working fluid.

The dust lip 314 serves to block entrance of external foreign substances.

The main lip 312 has a pocket portion formed in the outer side portion thereof, and a spring 320 is mounted in the pocket portion. The spring 320 constricts the main lip 312 so that the main lip 312 is in tighter contact with the outer circumferential surface of the shaft.

The electrical 1 path fabric 330 functions to transmit electricity remaining in the shaft 15 in a direction indicated by the arrow a to discharge the electricity to the motor housing 11. As described above, if electricity remains in the shaft 15, the electricity leaks to the bearing 13 and thus causes the occurrence of arc, leading to damage to the bearing 13.

The electrical path fabric 330 may be fixed to the seal main body 310 in a bonding manner. This means that the electrical path fabric 330 is capable of being applied to any of various general oil seals. It is possible to use an oil seal having only a sealing function not only as a general sealing element but also as a grounding element exhibiting a greatly improved grounding function merely by attaching the electrical path fabric 330 to the oil seal.

The electrical path fabric 330 is made by weaving metallic yarns. Accordingly, the shape or size of the electrical path fabric 330 may be varied freely. Since the electrical path fabric 330 is made by weaving metallic yarns, the electrical path fabric 330 is flexible, and thus is hardly worn by friction caused by contact with the shaft that rotates. Therefore, the electrical path fabric 330 has a longer lifespan than the oil seal.

Figure 3:
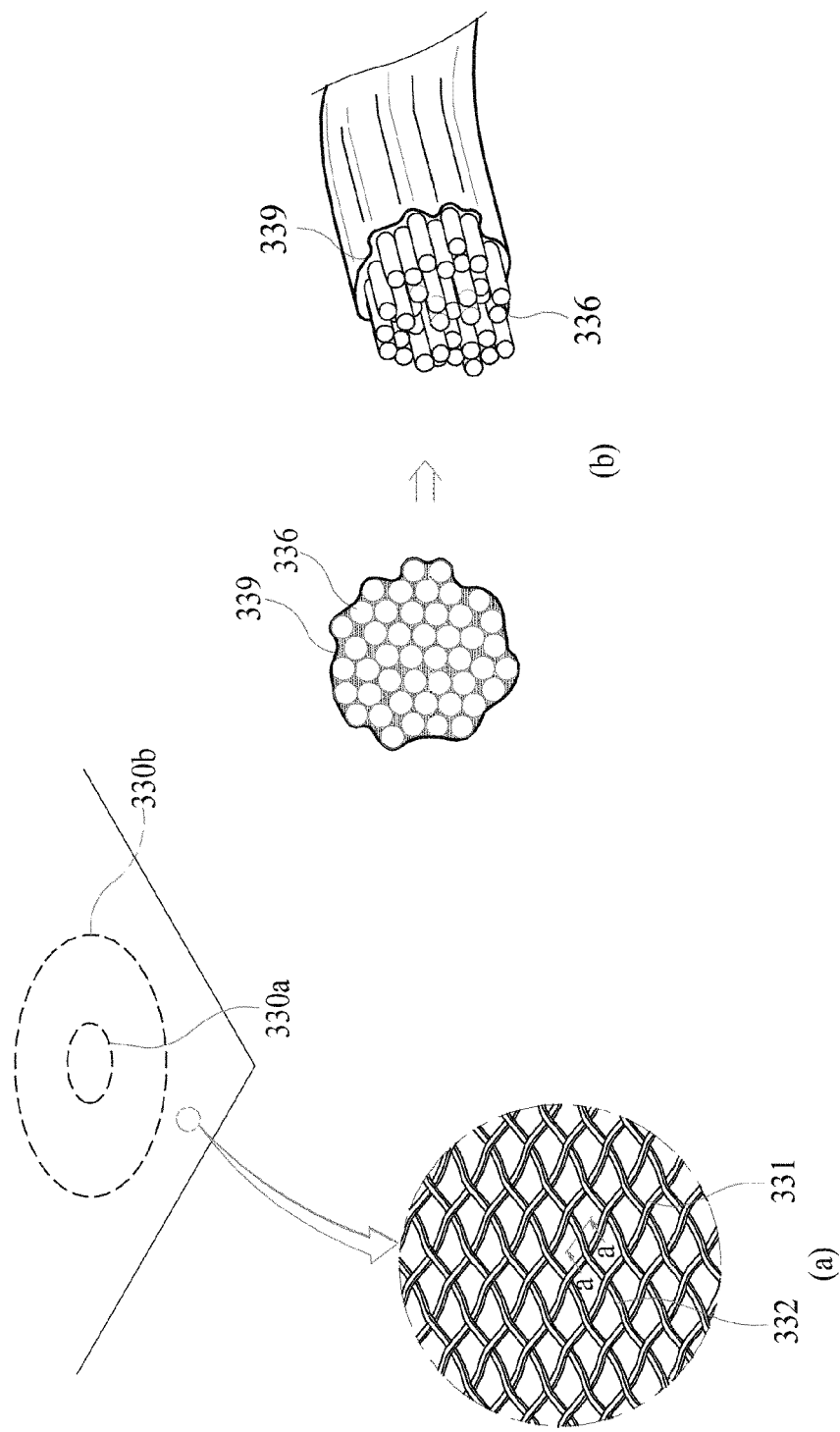
FIG. 3 is a view for explaining the structure of an exemplary electrical path fabric that is applied to the composite oil seal having an electric corrosion prevention function according to the embodiment of the present invention.

As shown in FIG. 3, the electrical path fabric 330 has a shape of a hollow disc having a shaft hole 330a formed in the center thereof. The shaft hole 330a is a hole through which the shaft 15 passes. The inner diameter of the shaft hole 330a is smaller than the diameter of the shaft 15, and the outer periphery of the electrical path fabric 330 is in contact with the inner circumferential surface of an opening 11a formed in the motor housing 11.

The metallic yarns forming the electrical path fabric 330 may be unit stainless yarns 331 and 332, each of which is formed by combining a plurality of stainless yarns 336, as shown in FIG. 3(b). A fabric structure is formed by weaving the unit stainless yarns.

Figure 5:
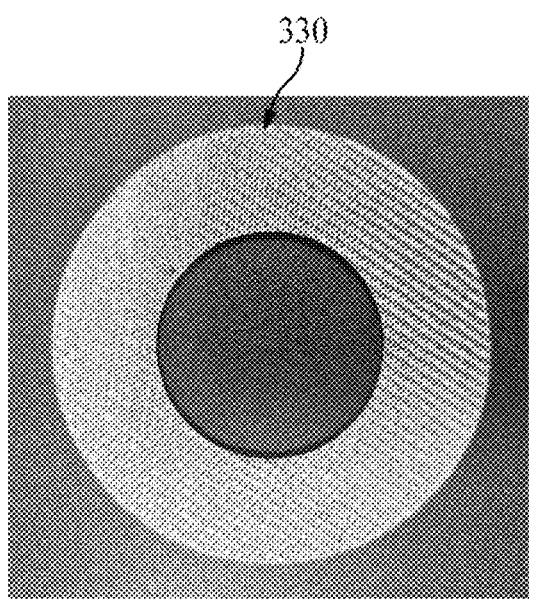
FIG. 5 is a photograph of the electrical path fabric shown in FIG. 3.

In this case, as shown in FIGS. 3 and 5, the electrical path fabric 330 may be a twill fabric formed by weaving the unit stainless yarns in such a manner that warps 331 and wefts 332 cross each other. The twill fabric is referred to as a twill weave, which has diagonal twill lines on the surface thereof. For example, as shown in FIG. 3(a), the twill fabric is composed of three warps and three wefts, and may be a 2-up and 1-down (2/1) or 1-up and 2-down (1/2) twill weave.

The twill fabric has various surface structures depending on variation in twill lines. Further, because the twill fabric has a small number of weave points, the threads thereof move freely, and thus the twill fabric is highly resistant to wrinkles and is flexible. For these reasons, the twill fabric is suitable for the electrical path fabric 330.

Figure 4:
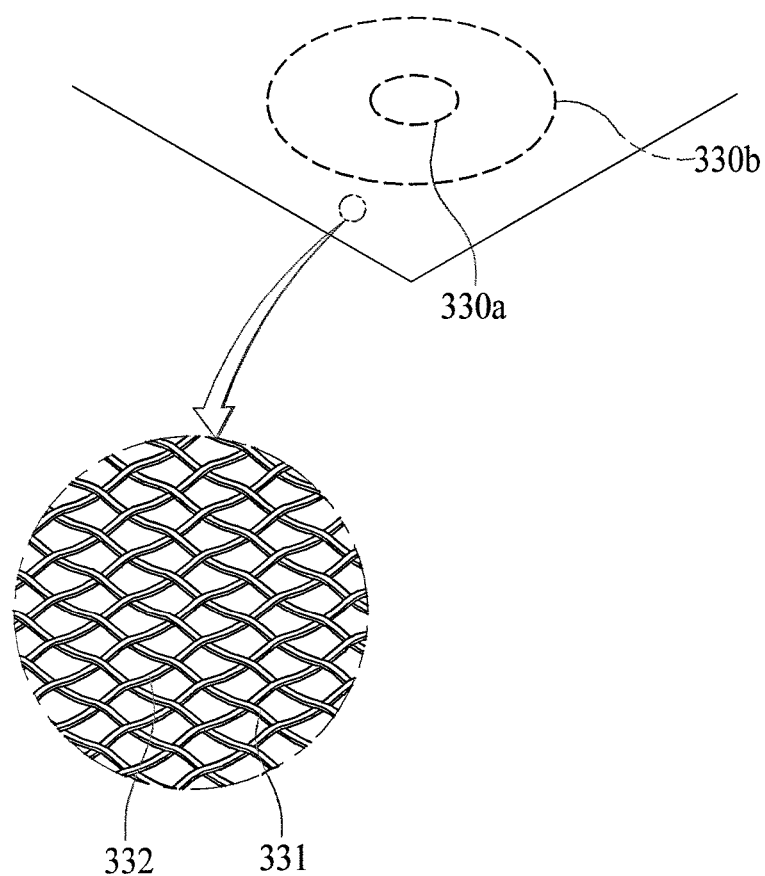
FIG. 4 is a view for explaining the structure of another exemplary electrical path fabric that is applied to the composite oil seal having an electric corrosion prevention function according to the embodiment of the present invention.

Alternatively, as shown in FIG. 4, the electrical path fabric 330 according to the present invention may be a plain weave formed by weaving the unit stainless yarns in such a manner that a warp and a weft cross over and under one another.

The shaft hole 330a and the outer peripheral portion 330b of the electrical path fabric 330 may be formed through a cutting process using a laser or a knife.

Meanwhile, the electrical path fabric may be coated with a protective film 339 made of a conductive coating material. The protective film 339 prevents the metallic yarns of the electrical path fabric from unraveling after the shaft hole and the outer peripheral portion of the electrical fabric is formed through a cutting process.

In this case, the protective film 339 may be made of a polyimide or silicone coating liquid. The protective film 339 may be coated on the electrical path fabric through impregnation of the electrical path fabric with the coating liquid or by spraying the coating liquid onto the electrical path fabric.

The electrical path fabric 330 may be formed such that the center portion thereof is adhered to the seal main body 310, one end thereof is in contact with the inner surface of the motor housing, and the other end thereof is in contact with the outer surface of the shaft.

According to the present invention, since the electrical path fabric is manufactured through processes of weaving and cutting metallic yarns and is attached to the seal main body, the electrical path fabric may be used irrespective of the diameter of the shaft or a gap between the shaft and the inner circumferential surface of the motor housing. Because the inner diameter of the conventional shaft ground ring is not adjusted, the conventional shaft ground ring has poor versatility. That is, if the conventional shaft ground ring does not fit the specifications of the shaft, it is impossible to mount the same to the shaft.

As is apparent from the above description, the composite oil seal having an electric corrosion prevention function of the present invention configured as described above transmits current induced in a shaft to the outside while performing a basic sealing function in the state of being mounted to the shaft, thereby preventing damage to a bearing, preventing electrical defects of a motor, and increasing the lifespan of the motor.

In addition, since the electrical path fabric is made of a low-priced fiber material, the electrical path fabric may be used semi-permanently, and it may not be necessary to machine a motor housing in order to mount the electrical path fabric.

In addition, since elongation of the electrical path fabric is increased in both the circumferential direction and the radial direction about the center of the seal main body, the durability and electrical conductivity thereof are increased.

In addition, it is possible to ensure oil sealing and to prevent electric corrosion using the integrated-type oil seal without using a conventional high-priced shaft ground ring (SGR). Accordingly, it is economical.

In addition, since it is not necessary to mount the shaft ground ring (SGR), the size of an available space in the motor is increased, the assemblability thereof is improved, and the weight thereof is reduced.

Although specific embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A composite oil seal having an electric corrosion prevention function, the composite oil seal being mounted on a shaft in a motor housing to prevent leakage of oil in the motor housing, the composite oil seal comprising:
    a seal main body formed of an elastic material, the seal main body having an outer circumferential surface formed to be in tight contact with an inner circumferential surface of the motor housing and at least one lip protruding inwards so as to be in contact with an outer circumferential surface of the shaft; and
    an electrical path fabric formed of woven metallic yarns, the electrical path fabric being mounted to the seal main body to electrically connect the shaft to the motor housing so that current induced in the shaft flows to the motor housing,
    wherein the electrical path fabric is formed in a circular disc-shape having a central hole through which the shaft passes, an inner rim, an outer rim, a first flat side attached to the seal main body, and a second flat side opposite to the first flat side, and
    wherein a diameter of the central hole is smaller than a diameter of the shaft and a diameter of the electrical path fabric is greater than a diameter of the inner circumferential surface of the motor housing such that the inner rim and the outer rim are bent in a direction that the second flat side faces, with the first flat side in direct contact with both the outer circumferential surface of the shaft and the inner circumferential surface of the motor housing.

2. The composite oil seal according to claim 1, wherein the metallic yarns are unit stainless yarns, each being formed by combining a plurality of stainless yarns, and
    wherein the electrical path fabric is a plain weave formed by weaving the unit stainless yarns in such a manner that a warp and a weft cross over and under one another.

3. The composite oil seal according to claim 1, wherein the metallic yarns are unit stainless yarns, each being formed by combining a plurality of stainless yarns, and
    wherein the electrical path fabric is a twill weave formed by weaving the unit stainless yarns in such a manner that warps and wefts cross each other.

4. The composite oil seal according to claim 1, further comprising:
    a rigid frame disposed in the seal main body in order to impart rigidity to the seal main body.

5. The composite oil seal according to claim 1, wherein the electrical path fabric is coated with a protective film made of a conductive coating material.

6. The composite oil seal according to claim 5, wherein the protective film is made of polyimide or silicone.

* * * * *